United States Patent
Schmidt et al.

(10) Patent No.: US 7,401,590 B2
(45) Date of Patent: Jul. 22, 2008

(54) ACTIVE AIR INTAKE FOR AN ENGINE

(75) Inventors: Gregory R. Schmidt, Port Washington, WI (US); Everett H. Paddock, Hartland, WI (US); Andrew J. Stahr, Wauwatosa, WI (US); Kyle G. Wick, Menomonee Falls, WI (US); Erick L. Gruber, Rubicon, WI (US); David L. Zwart, Wauwatosa, WI (US); Brian K. Black, Roscoe, IL (US); Frank Savage, West Bend, WI (US); Louis Netz, Grafton, WI (US); Willie G. Davidson, Delafield, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/539,821

(22) Filed: Oct. 9, 2006

(65) Prior Publication Data

US 2008/0083393 A1    Apr. 10, 2008

(51) Int. Cl.
*F02B 77/04* (2006.01)
(52) U.S. Cl. .................... 123/198 E; 123/336
(58) Field of Classification Search ............ 123/336, 123/337, 198 E, 184.21, 184.31; 55/385.3
See application file for complete search history.

(56) References Cited

U.S. PATENT DOCUMENTS

| 4,215,665 | A | 8/1980 | Stambaugh |
| 4,408,576 | A | 10/1983 | Sakaoka |
| 4,422,415 | A | 12/1983 | Matsuo et al. |
| 4,423,706 | A | 1/1984 | Onodera |
| 4,483,282 | A | 11/1984 | Sakaoka |
| 4,759,320 | A | 7/1988 | Fujii et al. |
| 4,821,685 | A | 4/1989 | Matsushima et al. |
| 4,890,586 | A | 1/1990 | Fujii et al. |
| 5,096,010 | A | 3/1992 | Ojala et al. |
| 5,176,114 | A | 1/1993 | Brackett |
| 5,261,231 | A | 11/1993 | Huh |
| 5,307,771 | A | 5/1994 | Stahel, II et al. |
| 5,311,848 | A | 5/1994 | Isaka et al. |
| 5,333,576 | A | 8/1994 | Verkleeren |
| 5,438,964 | A | 8/1995 | Breidenbach |
| 5,524,585 | A | 6/1996 | Conoscenti |
| 5,571,239 | A | 11/1996 | Kameda et al. |

(Continued)

FOREIGN PATENT DOCUMENTS

DE    4133815 A1    4/1993

(Continued)

*Primary Examiner*—Stephen K. Cronin
*Assistant Examiner*—Hyder Ali
(74) *Attorney, Agent, or Firm*—Michael Best & Friedrich LLP (57) ABSTRACT

An intake system for a motorcycle having an engine. The intake system includes an air box having a first opening for receiving intake air and a second opening for supplying the intake air from the air box to a throttle assembly of the engine. A filter element is disposed within the air box for separating debris from the intake air. A valve is disposed within the air box between the filter element and the second opening. The valve is movable to provide a variable restriction to intake air flow through the air box.

19 Claims, 8 Drawing Sheets

U.S. PATENT DOCUMENTS

| | | | |
|---|---|---|---|
| 5,590,628 A | 1/1997 | Patyi et al. | |
| 5,628,287 A | 5/1997 | Brackett et al. | |
| 5,632,239 A | 5/1997 | Patyi et al. | |
| 5,758,614 A | 6/1998 | Choi | |
| 5,775,283 A | 7/1998 | Sawai et al. | |
| 5,819,696 A | 10/1998 | Wada | |
| 5,860,400 A | 1/1999 | Stuart et al. | |
| 5,860,405 A | 1/1999 | Muramatsu et al. | |
| 6,047,677 A | 4/2000 | Kim | |
| 6,073,601 A | 6/2000 | Guichard et al. | |
| 6,125,820 A | 10/2000 | Hiraoka | |
| 6,135,079 A | 10/2000 | Fuesser | |
| 6,148,782 A | 11/2000 | Fuesser | |
| 6,196,186 B1 | 3/2001 | Nagasaka et al. | |
| 6,209,503 B1 | 4/2001 | Komada et al. | |
| 6,263,850 B1 | 7/2001 | Winmill et al. | |
| 6,267,091 B1 | 7/2001 | Nishida et al. | |
| 6,279,528 B1 | 8/2001 | Happenhofer et al. | |
| 6,378,471 B1 | 4/2002 | Yamada et al. | |
| 6,382,161 B1 | 5/2002 | Alex et al. | |
| 6,422,184 B1 | 7/2002 | Kreuter | |
| 6,422,201 B1 | 7/2002 | Yamada et al. | |
| 6,450,141 B1 | 9/2002 | Sakuma | |
| 6,523,517 B2 | 2/2003 | Ohsuga et al. | |
| 6,637,397 B2 | 10/2003 | Ward et al. | |
| 6,701,881 B2 | 3/2004 | Ohsuga et al. | |
| 6,705,272 B2 | 3/2004 | Leipelt et al. | |
| 6,726,742 B2 | 4/2004 | Arden et al. | |
| 6,752,115 B2 | 6/2004 | Fiesel et al. | |
| 6,790,251 B1 | 9/2004 | Brady, Jr. | |
| 6,840,206 B2 | 1/2005 | Yasui | |
| 6,880,516 B2 | 4/2005 | Maier et al. | |
| 6,880,526 B2 | 4/2005 | Uneta et al. | |
| 6,886,532 B2 | 5/2005 | Nohara et al. | |
| 6,915,774 B2 | 7/2005 | Sakai | |
| 6,955,698 B2 | 10/2005 | Hettmann et al. | |
| 7,134,422 B2 * | 11/2006 | Yanagibashi et al. | 123/336 |
| 2002/0066431 A1 | 6/2002 | Ino et al. | |
| 2002/0073961 A1 | 6/2002 | Tanaka et al. | |
| 2002/0083911 A1 | 7/2002 | Ward et al. | |
| 2002/0117138 A1 | 8/2002 | Katayama | |
| 2002/0179030 A1 | 12/2002 | Fiesel et al. | |
| 2003/0034004 A1 | 2/2003 | Leipeit et al. | |
| 2003/0226536 A1 | 12/2003 | Yasui | |
| 2003/0230272 A1 | 12/2003 | Stuart | |
| 2004/0035383 A1 | 2/2004 | Ward et al. | |
| 2004/0159299 A1 | 8/2004 | Uchiyama | |
| 2004/0226531 A1 | 11/2004 | Kino et al. | |
| 2004/0255893 A1 | 12/2004 | Stuart | |
| 2005/0076872 A1 | 4/2005 | Uchiyama et al. | |
| 2005/0139192 A1 | 6/2005 | Lechner | |
| 2005/0188940 A1 | 9/2005 | Huff | |
| 2005/0188941 A1 | 9/2005 | Ward et al. | |
| 2005/0279310 A1 | 12/2005 | Kondo et al. | |
| 2006/0005798 A1 | 1/2006 | Chu | |
| 2006/0037584 A1 | 2/2006 | Imamura | |
| 2006/0037585 A1 | 2/2006 | Imamura | |
| 2006/0065237 A1 | 3/2006 | Akima et al. | |

FOREIGN PATENT DOCUMENTS

| | | |
|---|---|---|
| JP | 63239350 A | 10/1988 |

\* cited by examiner

ACTIVE AIR INTAKE FOR AN ENGINE

BACKGROUND

The present invention relates to a device and method for controlling the intake of air into an engine. More specifically, the invention relates to a device and method for controlling an intake state of an air box to selectively affect the operation of a motorcycle engine under predetermined conditions.

SUMMARY

In one embodiment, the invention provides an intake system for a motorcycle having an engine. The intake system includes an air box having a first opening for receiving intake air and a second opening for supplying the intake air from the air box to a throttle assembly of the engine. A filter element is disposed within the air box for separating debris from the intake air. A valve is disposed within the air box between the filter element and the second opening. The valve is movable to provide a variable restriction to intake air flow through the air box.

In another embodiment, the invention provides a motorcycle including an engine, an air box, and a throttle assembly. The air box has an inlet for receiving intake air and an outlet. The throttle assembly is positioned to receive intake air from the outlet and direct the intake air into the engine for combustion. A filter element is positioned in the air box. A valve is positioned in the air box between the filter element and the outlet.

In yet another embodiment, the invention provides a method of operating an engine of a motorcycle having a throttle assembly, an air box, and an engine controller. The throttle assembly controls the rate of intake air into the engine. The air box directs intake air into the throttle body and cleans the intake air with a filter element. The method includes running the engine, opening the throttle assembly to a substantially full throttle position, and restricting the flow of intake air into the engine by moving a valve that is positioned in the air box from a first position to a second position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
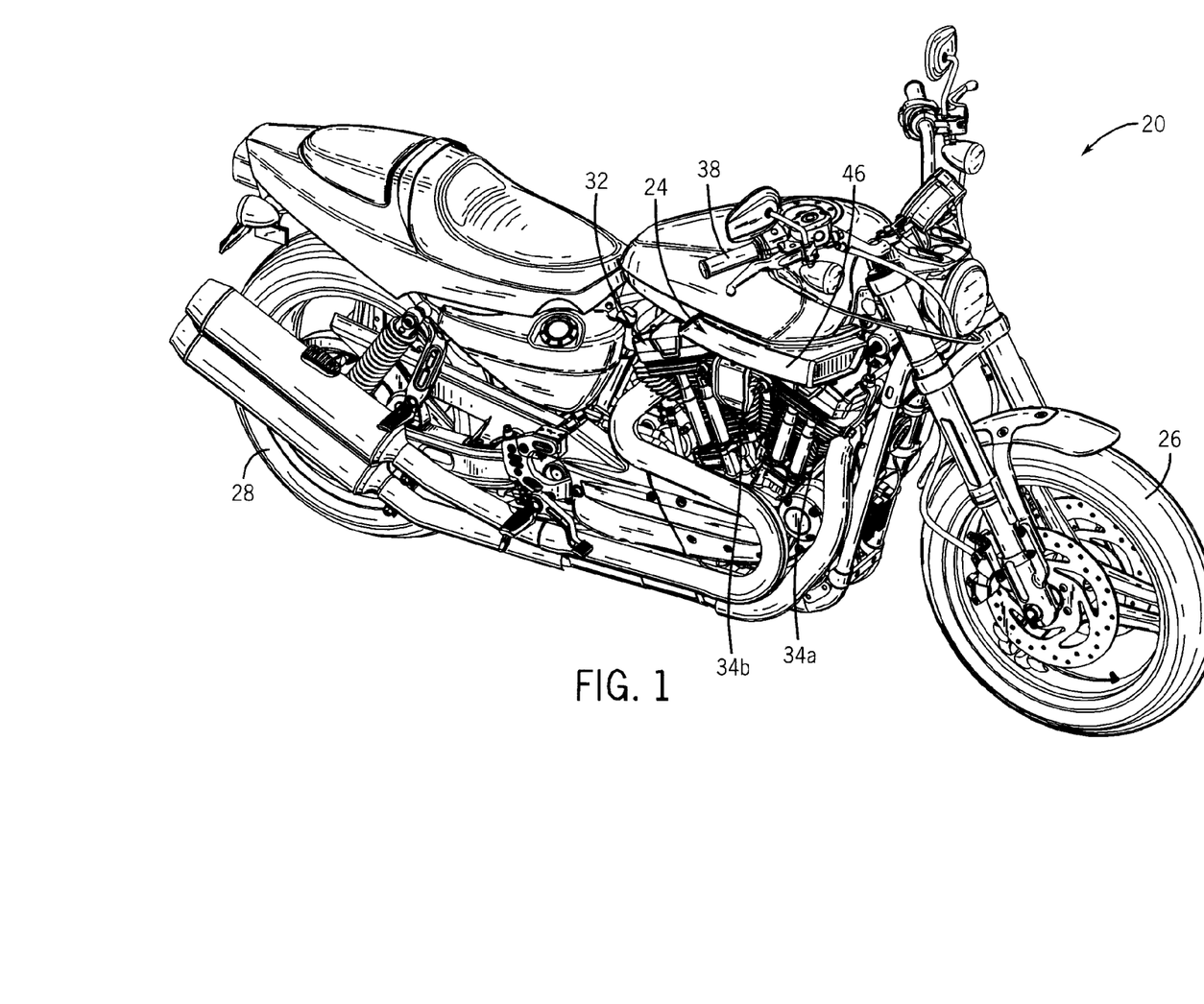
FIG. 1 is a perspective view of a motorcycle embodying the present invention.
Figure 2:
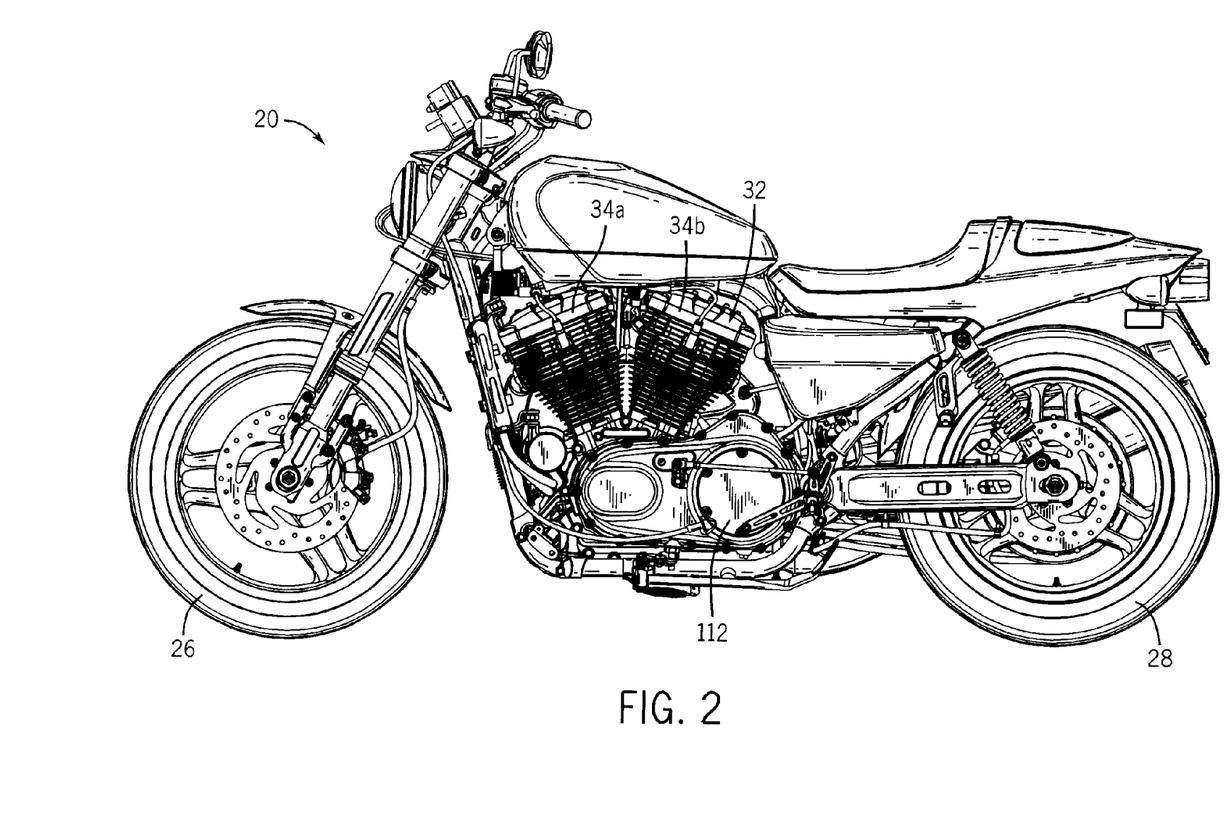
FIG. 2 is a side view of the motorcycle of FIG. 1.
Figure 3:
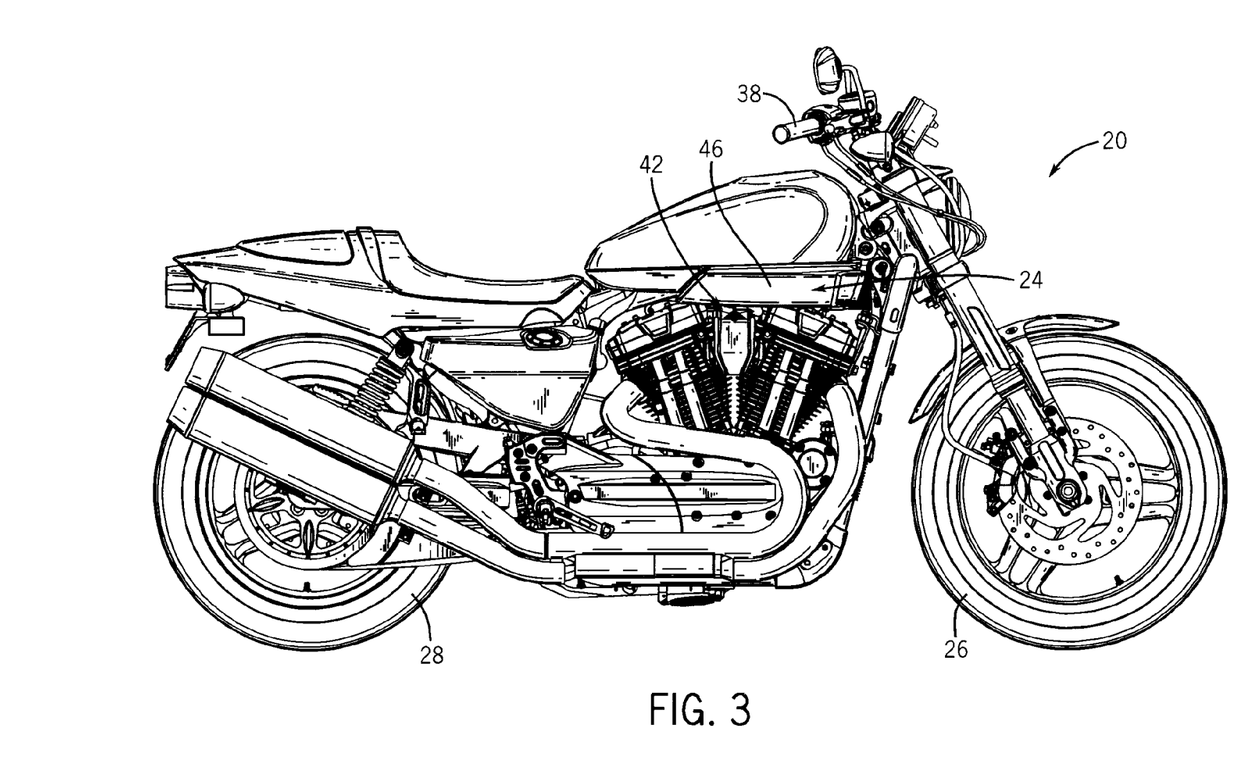
FIG. 3 is an opposite side view of the motorcycle of FIG. 1.

A motorcycle 20 including an active intake system 24 is illustrated in FIGS. 1-3. The motorcycle 20 includes a front wheel 26, a rear wheel 28, and an engine 32. The engine 32 provides power to the rear wheel 28 through a transmission 112. The engine 32 includes two cylinders 34a, 34b for combusting an air-fuel mixture. The crankshaft rotational speed (or simply "engine speed") is controlled by a throttle control 38, which is coupled either mechanically or electro-mechanically to a throttle assembly 42 (FIG. 3). The throttle control 38 is a grip control that is rotated by a rider's right hand.

As understood by one skilled in the art, the throttle assembly 42 includes an intake funnel and a throttle body defining a flow passage and a throttle plate (not shown) within the flow passage. The throttle plate is movable between a substantially closed (i.e., "idle") position and a substantially fully open (i.e., "full throttle") position in response to the throttle control 38 being rotated from an at-rest position to a full throttle position.

Figure 4:
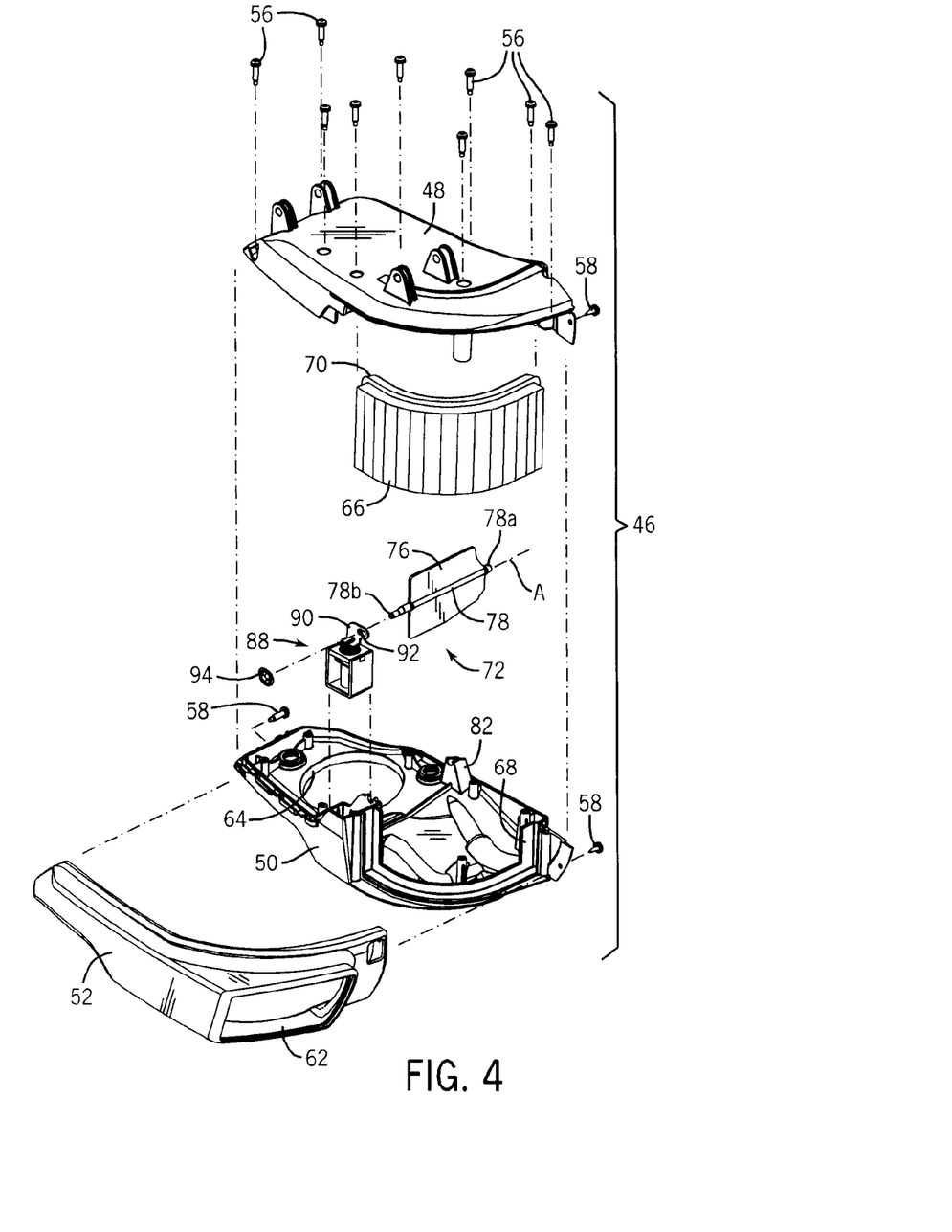
FIG. 4 is an exploded perspective view of an air box assembly of the motorcycle of FIG. 1.

As shown in FIG. 4, the active intake system 24 includes an air box assembly, referred to hereinafter as the air box 46. The air box 46 includes an upper housing 48, a lower housing 50, and a front fascia 52. The upper housing 48 and the lower housing 50 are coupled together by fasteners 56. Additional fasteners 58 are used to couple the front fascia 52 to the upper housing 48 and lower housing 50.

With continued reference to FIG. 4, the upper housing 48 and the lower housing 50 combine to define a flow passage through the air box 46. The front fascia 52 includes an inlet opening 62 for receiving intake air into the air box 46. The lower housing 50 includes an outlet opening 64 for supplying the intake air to the throttle assembly 42. A filter element 66 is positioned adjacent the inlet opening 62 to separate debris from the intake air. The filter element 66 is held in place by the upper housing 48 and the lower housing 50. The lower housing 50 includes a receiving channel 68 for receiving an outer rim 70 of the filter element 66. The filter element 66 is securely positioned by the receiving channel 68 of the lower housing 50.

Figure 5:
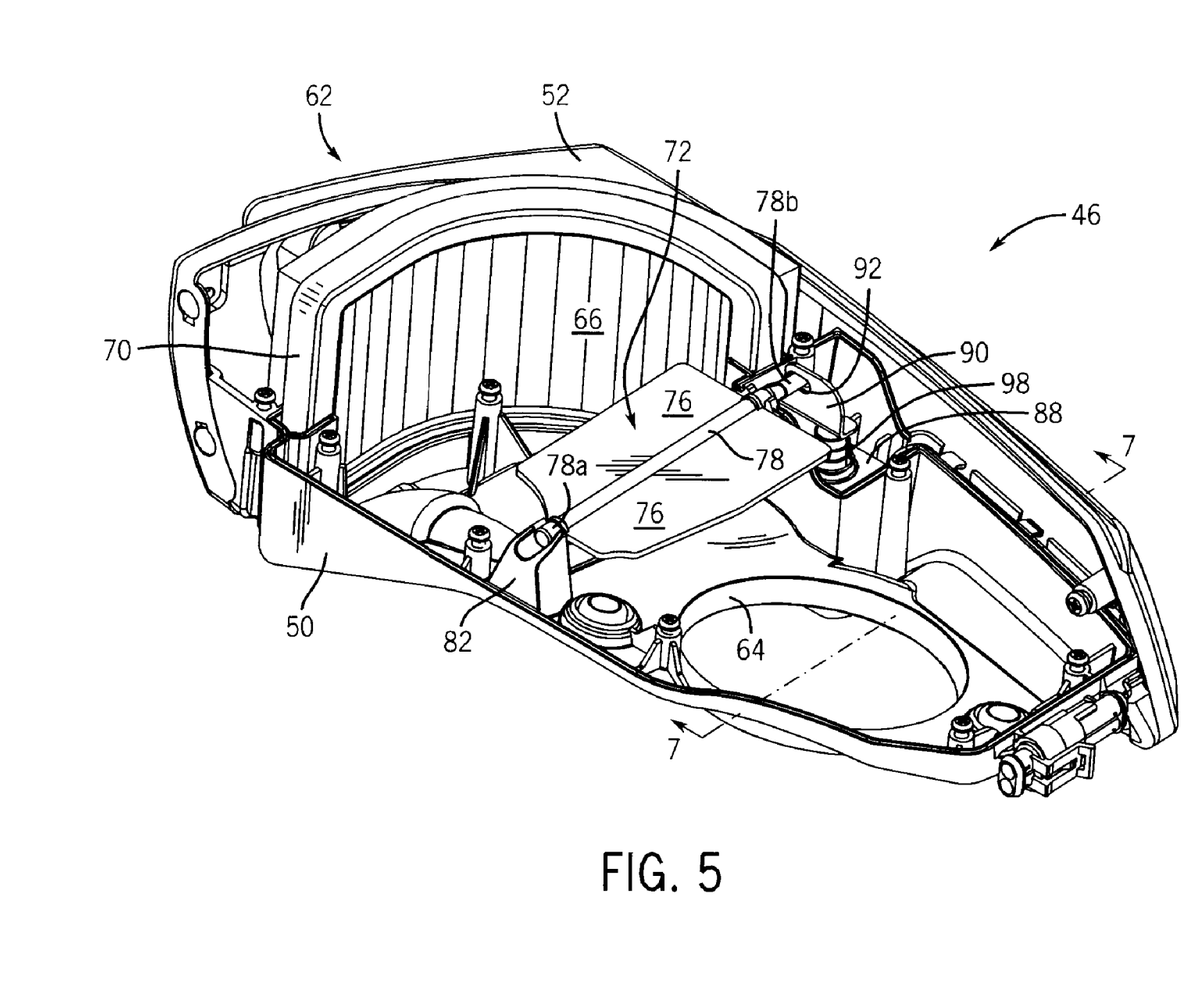
FIG. 5 is a perspective view of the air box assembly of FIG. 4 with a valve in an open position and an upper housing removed for clarity.
Figure 6:
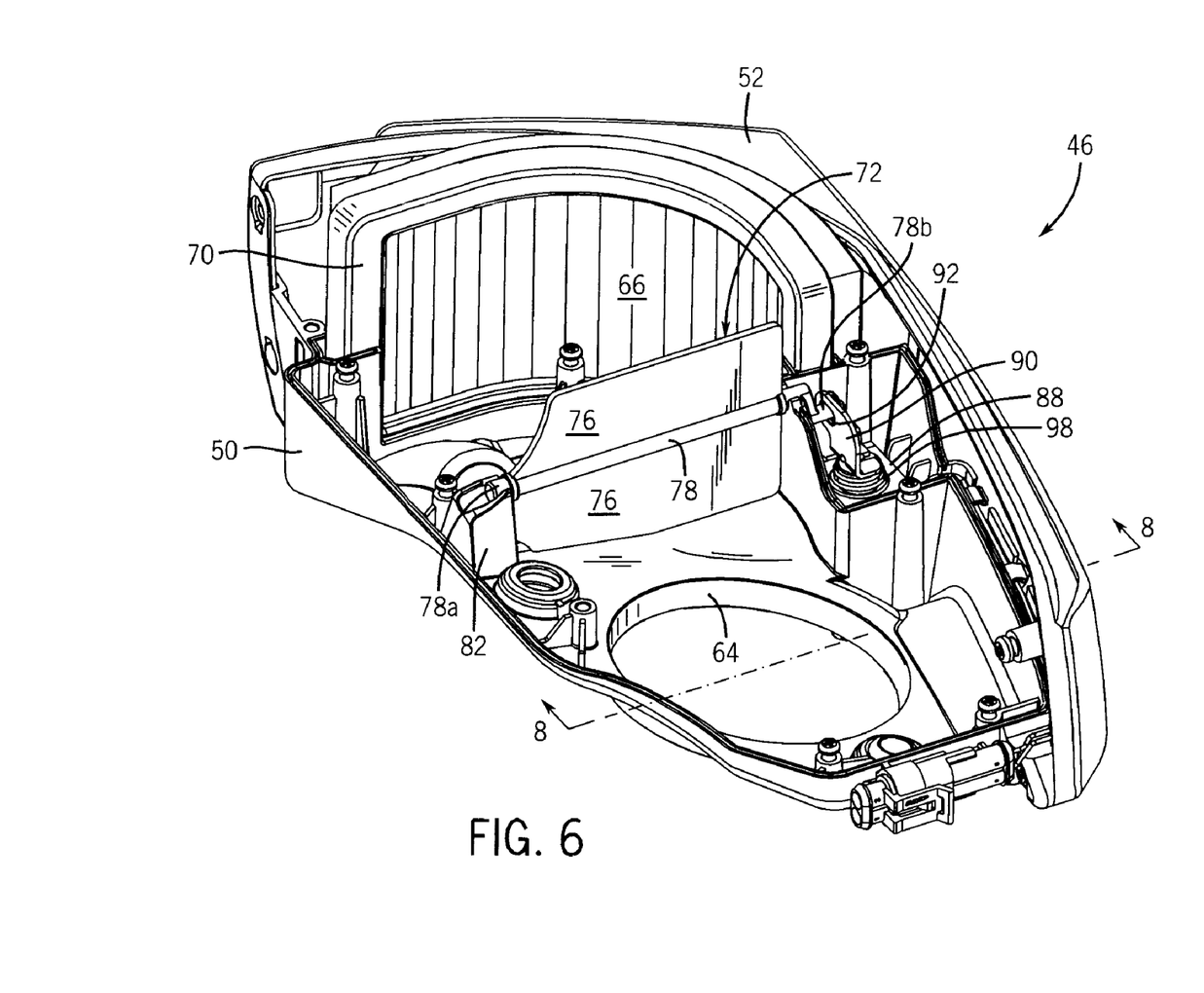
FIG. 6 is a view similar to FIG. 5 with the valve in a closed position.

With reference to FIGS. 4-6, the active intake system 24 further includes a valve 72 positioned in the air box 46. Specifically, the valve 72 is positioned in the flow passage between the inlet opening 62 and the outlet opening 64. In this position, the valve 72 is downstream of the filter element 66 and upstream of the throttle assembly 42. Therefore, the valve 72 is shielded by the filter element 66 from the debris that the filter element 66 separates from the intake air. Also, the valve 72 is positioned to vary the intake passage geometry and affect the flow of intake air through the intake passage before the intake air reaches the throttle assembly 42.

The valve 72 includes a plate or body portion 76 and a rod portion 78. The rod portion 78 includes two ends 78a and 78b extending out from the sides of the body portion 76. The first end 78a is held in a grooved support 82. The support 82 is formed integrally as part of the lower housing 50. A second support (not shown) is formed integrally as part of the upper housing 48 and is positioned adjacent the support 82 to hold the first end 78a in place. In other embodiments, one or both of the supports are provided as separate pieces from the upper housing 48 and lower housing 50, respectively. Different structures for positioning the valve 72 are also within the spirit and scope of the invention.

The second end 78b of the valve's rod portion 78 is coupled to an actuator 88. The actuator 88 includes a flange 90, in which a slot 92 is formed. The second end 78b is received within the slot 92. A retainer 94 is placed on the second end 78b to keep the second end 78b within the slot 92. The second end 78b is offset a distance (via two ninety-degree angles) from a main axis A of the rod portion 78 (FIG. 6), which is also the main axis of the valve 72. Thus, the second end 78b forms a crank, allowing a force at the second end 78b to impart a torque to rotate the valve 72 about the main axis A. In the illustrated embodiment, the actuator 88 is a solenoid configured to apply a force to the second end 78b via linear actuation. In other embodiments, the actuator 88 has rotational output, and the second end 78b may or may not be offset from the main axis A.

Figure 7:
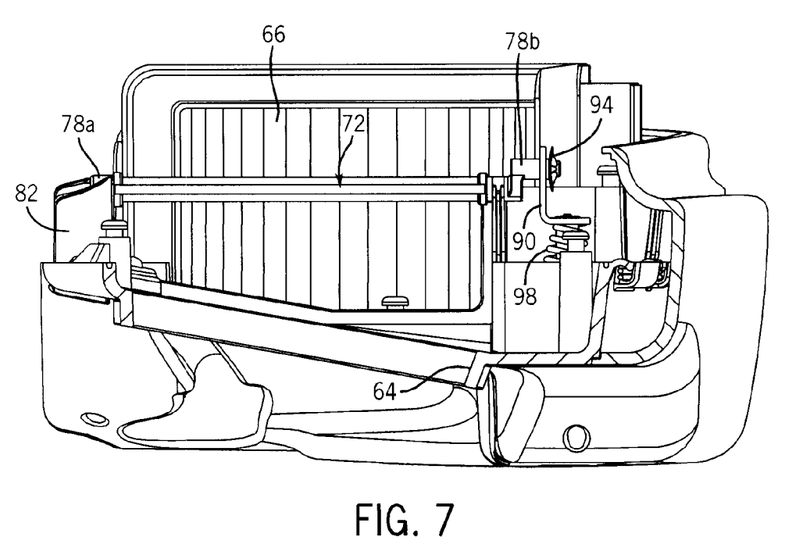
FIG. 7 is a cross-sectional view taken along line 7-7 of FIG. 5.
Figure 8:
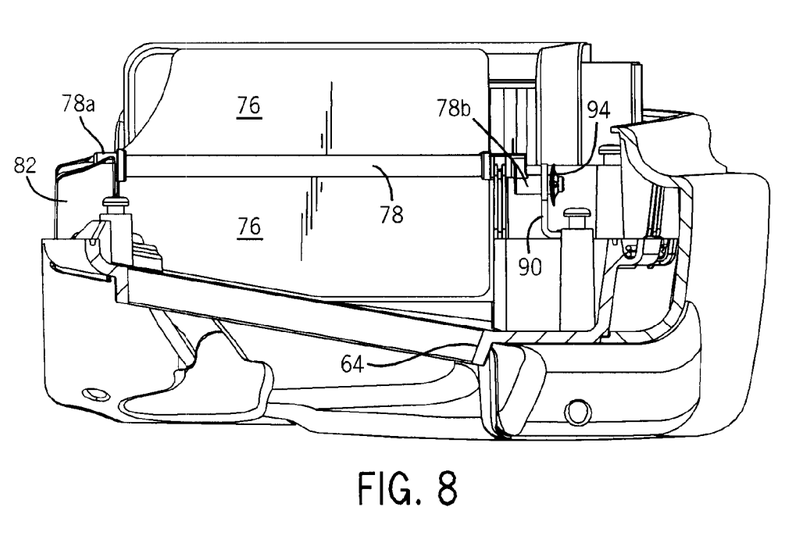
FIG. 8 is a cross-sectional view taken along line 8-8 of FIG. 6.

The actuator 88 is movable between a first position (shown in FIGS. 5 and 7) and a second position (shown in FIGS. 6 and 8). The actuator 88 is biased to the first position by a spring 98. Accordingly, the valve 72 is biased to a first position (i.e., the open position) as shown in FIGS. 5 and 7. When the actuator 88 is activated, such as by an electric signal, the spring 98 is compressed and the actuator 88 moves to the second position, moving the valve 72 to a second position (i.e., the closed position) as shown in FIGS. 6 and 8.

As mentioned above, the filter element 66 shields the valve 72 from debris that is present in unfiltered intake air. Likewise, the actuator 88 is shielded from debris by the filter element 66. The positioning of the valve 72 and the actuator 88 inside the air box 46 downstream of the filter element 66 provides protection against impact damage, clogging of the intake passage, and jamming of the moving parts. Also, the filter element 66 shields electrical components and connections associated with the actuator 88. The filter element 66 keeps the electrical components and connections clean, extending the useful life of the actuator 88.

Figure 9:
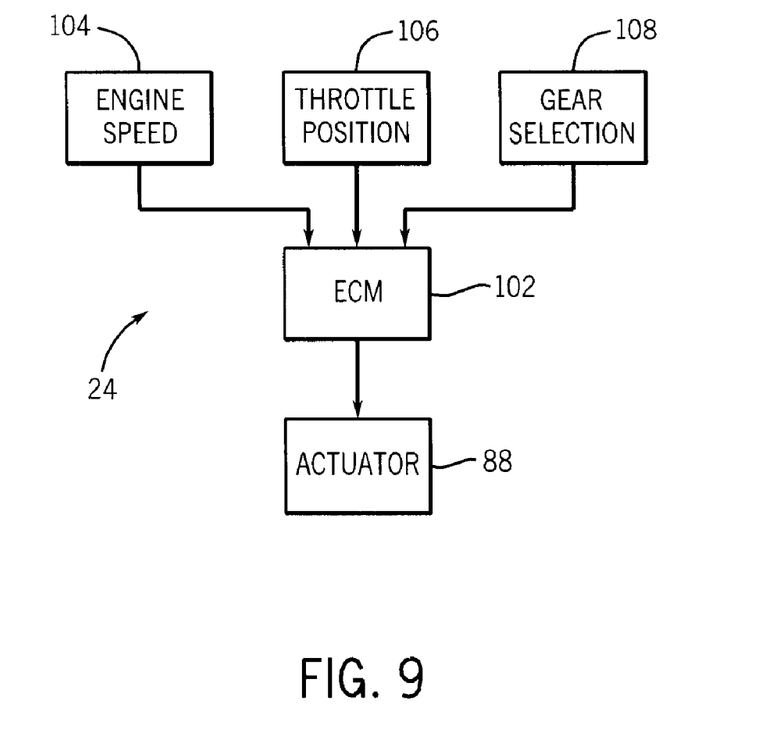
FIG. 9 is a schematic diagram illustrating the function of an active intake system.

The actuator 88 is electrically coupled to a controller, such as the motorcycle's engine control module (ECM) 102 as shown in FIG. 9. The ECM 102 is configured to send a signal (e.g., an electrical signal) to the actuator 88 to activate the actuator 88 from the first position (FIGS. 5 and 7) to the second position (FIGS. 6 and 8) to move the valve 72 from the open position to the closed position. FIG. 9 also illustrates an engine speed sensor 104, a throttle position sensor 106, and a gear selection sensor 108 all coupled to the ECM 102 and configured to send signals (e.g., electrical signals) indicative of respective parameters of the motorcycle's operating condition to the ECM 102.

During some operating conditions of the motorcycle engine 32, the flow rate of intake air into the engine 32 is controlled by the throttle assembly 42 (i.e., the position of the throttle plate). Under these operating conditions, the rider twists the throttle control 38 away from the at-rest position, and the throttle plate opens an amount proportional to the rotation of the throttle control 38. When the rider returns the throttle control 38 to the at-rest position, the throttle plate returns to the idle position. During some operating conditions, the motorcycle engine 32 may make excessive noise when the amount or flow rate of intake air is controlled solely by the throttle assembly 42. For example, when the engine 32 is running at a low engine speed (mostly closed throttle position) and the throttle assembly 42 is quickly moved to the substantially fully-open position, the engine 3:2 may emit a particularly high level of noise. The engine's noise emission can be reduced by at least partially counteracting the effect of opening the throttle assembly 42.

When the ECM 102 receives a signal from the engine speed sensor 104 indicating that the engine speed is below a predetermined speed and also receives a signal from the throttle position sensor 106 indicating that the throttle assembly 42 is in the substantially fully-open position, the ECM 102 sends a signal to the actuator 88 to close the valve 72 as described above. When the valve 72 moves to the closed position, it at least partially restricts the flow of intake air through the air box 46, counteracting the effect of the open throttle assembly 42 and allowing the engine 32 to build speed more gradually without generating excessive noise levels. In the closed position, the valve 72 blocks approximately 90% of the cross-sectional area of the air flow passage. As shown in FIG. 8, air is allowed to pass on both sides of the valve 72 when the valve 72 is in the closed position.

After a predetermined amount of time has passed, another signal is sent from the ECM 102 to the actuator 88 to re-open the valve 72. In some embodiments, the ECM 102 deactivates the actuator 88 to re-open the valve 72 before the predetermined amount of time has passed if the throttle assembly is at least partially closed by an input from the throttle control 38. In some embodiments, the ECM 102 deactivates the actuator 88 to re-open the valve 72 as soon as the engine speed reaches the predetermined speed (or a second predetermined speed). Other methods of determining when to deactivate the actuator 88 are also within the scope of the present invention.

The signal for re-opening the valve 72 (by de-activating the actuator 88) can simply be the termination of the signal that activates the actuator 88. For example, the ECM 102 may send a positive voltage signal to the actuator 88 to close the valve 72, and when the signal returns to zero Volts, the actuator 88 and the valve 72 are biased by the spring 98 back to the first position (the open position of the valve 72). Other signal conventions, including, but not limited to equal but opposite voltage signals may alternately be used to control the activation and deactivation of the actuator 88.

In some embodiments, the ECM 102 activates and deactivates the actuator 88 based on signals not only from the engine speed sensor 104 and the throttle position sensor 106, but also based on a signal from the gear selection sensor 108. In some such embodiments, the ECM 102 recognizes a combination of engine speed below a predetermined speed, substantially fully-open throttle position, and the transmission 112 of the motorcycle 20 being in a predetermined gear or one of a plurality of predetermined gears before activating the actuator 88 to close the valve 72. The ECM 102 deactivates the actuator 88 to re-open the valve 72 when at least one of three events occurs, the three events being: the engine speed reaching the predetermined speed, throttle position being at least partially closed, and the transmission 112 of the motorcycle 20 being shifted out of the predetermined gear(s). Signals from the engine speed sensor 104, the throttle position sensor 106, and/or the gear selection sensor 108 are sent to the ECM 102 to deactivate the actuator 88 when at least one of the deactivation events occurs (i.e., at least one of the activation conditions is no longer met). Alternately or in addition, the ECM 102 deactivates the actuator 88 after a predetermined time has elapsed since the closing of the valve 72 (i.e., elapsed time since the activation of the actuator 88).

In some embodiments, the ECM 102 activates the actuator 88 to close the valve 72 based on the position of the throttle assembly 42 and vehicle speed of the motorcycle 20. In some embodiments, the ECM 102 activates the actuator 88 to close the valve 72 when it recognizes a vehicle speed within a predetermined range and substantially fully open throttle position The vehicle speed is sensed directly or calculated by the ECM 102 (e.g., based upon a known measurement of the front and/or rear wheels 26, 28 and signals communicated to the ECM 102 by the engine speed sensor 104 and the gear position sensor 108). The throttle position is sensed and communicated to the ECM 102 by the throttle position sensor 106. The ECM 102 deactivates the actuator 88 to re-open the valve 72 after a predetermined amount of time has passed. In one embodiment, the actuator 88 is deactivated to re-open the valve 72 about two seconds after the actuator 88 is activated (i.e., about two seconds after the valve is moved from the open position to the closed position). Because the activation of the actuator 88 is dependent upon the vehicle speed and not simply the engine speed, the valve 72 is actuated to the closed position at different engine speeds based on the gear the transmission 112 is in. For example, the predetermined range of vehicle speed can be reached at a first engine speed when the transmission 112 is in a first predetermined gear and can be reached at a lower engine speed when the transmission 112 is in a higher gear. In some embodiments, the ECM 102 deactivates the actuator 88 when the throttle is at least partially closed, the vehicle speed of the motorcycle 20 is no longer within the predetermined range, and/or the transmission 112 is shifted to a different gear.

We claim:

1. An intake system for a motorcycle having an engine comprising:
    an air box having a first opening for receiving intake air and a second opening for supplying the intake air from the air box to a throttle assembly of the engine, the air box defining an intake passage between the first opening and the throttle assembly;
    a filter element disposed within the air box for separating debris from the intake air; and
    a valve disposed within the air box between the filter element and the second opening, the valve being movable to provide a variable restriction to intake air flow through the air box, and the valve being selectively operable to block most of the cross-sectional area of the intake passage.

2. The intake system of claim 1, wherein the filter element is positioned adjacent the first opening and the valve is shielded from the debris by the filter element.

3. The intake system of claim 1, further comprising an actuator coupled to the valve for moving the valve from a first position to a second position.

4. The intake system of claim 3, wherein the actuator includes a solenoid.

5. The intake system of claim 3, wherein the actuator is operable to move the valve from the second position to the first position.

6. The intake system of claim 3, wherein the first position is substantially open and the second position is substantially closed, and wherein the valve is biased to the first position.

7. The intake system of claim 3, further comprising a controller configured to activate the actuator to move the valve from the first position to the second position based on a position of the throttle assembly and at least one of engine speed and vehicle speed.

8. The intake system of claim 7, wherein the controller is configured to activate the actuator to move the valve from the first position to the second position when the throttle assembly is substantially fully open and the vehicle speed is near a predetermined speed.

9. The intake system of claim 1, wherein the valve is selectively operable to block about 90 percent of the cross-sectional area of the intake passage.

10. A motorcycle comprising:
    an engine;
    an air box having a first opening for receiving intake air and a second opening downstream of the first opening;
    a throttle assembly positioned to direct intake air into the engine, the throttle assembly including an intake funnel;
    a filter element disposed within the air box for separating debris from the intake air; and
    a valve disposed within the air box downstream of the filter element and upstream of the intake funnel, the valve being movable to provide a variable restriction to intake air flow through the air box.

11. A motorcycle comprising:
    an engine;
    an air box having an inlet for receiving intake air and an outlet;
    a throttle assembly positioned to receive intake air from the outlet and direct the intake air into the engine for combustion;
    a filter element positioned in the air box;
    a valve positioned in the air box between the filter element and the outlet;
    an actuator for moving the valve from a first position to a second position; and
    a controller configured to activate the actuator to move the valve from the first position to the second position based on a position of the throttle assembly and at least one of engine speed and vehicle speed.

12. The motorcycle of claim 11, wherein the controller is configured to activate the actuator to move the valve from the first position to the second position when the throttle assembly is substantially fully open and the vehicle speed is in a predetermined range.

13. The motorcycle of claim 11, wherein the controller is configured to activate the actuator at a first engine speed when the motorcycle is in a first pre-selected gear and is further configured to activate the actuator at a second engine speed, lower than the first engine speed, when the motorcycle is in a second pre-selected gear, higher than the first pre-selected gear.

14. The motorcycle of claim 11, wherein the actuator includes a solenoid.

15. The motorcycle of claim 11, wherein the first position is substantially open and the second position is substantially closed.

16. A method of operating an engine of a motorcycle having a throttle assembly for controlling the rate of intake air into the engine, an air box for directing intake air into the throttle body and cleaning the intake air with a filter element, and an engine controller, the method comprising:
    running the engine at an engine speed within a predetermined range;
    opening the throttle assembly to a substantially full throttle position;
    restricting the flow of intake air into the engine by moving a valve that is positioned in the air box from a first position to a second position while the engine is running within the predetermined speed range and the throttle assembly is opened to the substantially full throttle position; and
    shielding the valve with the filter element from debris in the intake air.

17. The method of claim 16, further comprising moving the valve from the second position to the first position after a predetermined amount of time has passed since the valve was moved to the second position.

18. The method of claim 16 further comprising:
  monitoring the throttle position of the throttle assembly and the engine speed with the engine controller; and
  sending a signal from the engine controller to an actuator to move the valve.

19. The method of claim 18, further comprising monitoring the vehicle speed with the engine controller, wherein the signal is sent from the engine controller to the actuator only when the vehicle speed is within a predetermined range.

* * * * *